United States Patent Office 3,707,495
Patented Dec. 26, 1972

3,707,495
ISOCYANATE PREPARATION
Kenneth D. MacKay, Circle Pines, Edgar R. Rogier, Hopkins, and Maurice M. Kreevoy, Minneapolis, Minn., assignors to General Mills Chemicals, Inc.
No Drawing. Filed Oct. 5, 1970, Ser. No. 78,296
Int. Cl. C07c 119/04
U.S. Cl. 260—453 P
11 Claims

ABSTRACT OF THE DISCLOSURE

Organic isocyanates are prepared by (1) treating an acyl halide with a metal azide in the presence of a quaternary ammonium salt to accelerate the reaction and (2) decomposing the resulting acyl azide to the organic isocyanate.

---

This invention relates to an improved process for preparing organic isocyanates. More particularly, it relates to such a process wherein an acyl halide is converted to an acyl azide in the presence of a quaternary ammonium compound.

Isocyanates are conventionally prepared by treating amines with phosgene. This route often involves several steps; namely, conversion of an acid to the nitrile, reduction of the nitrile to the amine and then treatment of the amine with phosgene. In many instances, it has been necessary to perform distillations after each step.

One of the oldest procedures for the preparation of isocyanates is the Curtius rearrangement which involves the thermal decomposition of an acyl azide. Such decomposition is known to proceed quantitatively in the absence of ultraviolet radiation. The usual synthesis of the acyl azide consists of adding an acetone (or other water soluble organic solvent) solution of the appropriate acyl halide to an aqueous metal azide (i.e. sodium azide) solution, followed by separation of the resulting acyl azide. The major difficulty under these conditions is the hydrolysis of the acyl halide, the acyl azide and any isocyanate which might have formed.

An alternate procedure employing the Curtius rearrangment has been the use of non-aqueous solvent systems containing the acyl halide and the metal azide, with the bulk of the metal salts present as undissolved solids, wherein the reaction is conducted at high temperatures with concomitant decomposition of the acyl azide to the isocyanate. The major disadvantage in such procedure is the relatively long reaction time, which is on the order of hours.

More recently, a multi-step process was discovered wherein a quaternary ammonium salt was first converted to a quaternary ammonium azide, the latter compound in a water immiscible organic solvent was separated from the aqueous metal azide solution and the solution of the quat azide was treated with the acyl halide to form the acyl azide. However, the resulting acyl azide containing solution includes a relatively large amount of quaternary ammonium halide and any excess quaternary ammonium azide. Without substantial removal of these quat salts, decomposition of the acyl azide to isocyanate yields a product often not as pure as desired due to side reactions, such as isocyanurate formation catalyzed by the said quat salts.

We have now discovered an improved process for preparing organic isocyanates. In this process a solution of an acyl halide in an essentially water immiscible organic solvent is contacted with a metal azide in the presence of a quaternary ammonium salt and sufficient water to allow interchange between the azide ion and the anion of the quaternary ammonium salt. The acyl azide is formed in this single step. The acyl azide containing organic solvent solution is then separated from the metal azide and metal halide containing phase and heated to decompose the acyl azide to the corresponding organic isocyanate. The solution of acyl azide in the organic solvent is preferably washed to remove part or all of any quaternary ammonium salts prior to being heated to decomposition temperatures. Our process has the advantage of a very short reaction period in the formation of the acyl azide from the acyl halide in contrast to prior art methods involving the use of non-aqueous solvents without the quaternary ammonium salt. Our process has the advantages over the previous quaternary ammonium azide procedure that a separate step is not required to form said azide and a small fraction of a mole of quaternary ammonium salt can be used for each mole of acyl halide. Thus amounts as low as 0.1 equivalent percent based on the equivalents of acyl halide have been used effectively and, correspondingly, the resulting acyl azide solution contains very low amounts of quaternary ammonium salts to be removed or to interfere with the decomposition of the acyl azide to isocyanate.

We believe that the first step in our process involves the following reactions which are occurring simultaneously (illustrated using an acyl chloride, a quaternary ammonium chloride and an aqueous solution of metal azide):

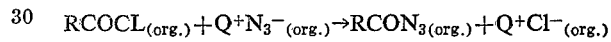

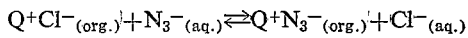

The resulting acyl azide is then decomposed as follows:

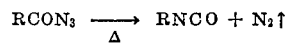

The process of the present invention can be used with any organic acyl halide which is essentially insoluble in water and has a solubility in an essentially water immiscible organic solvent of at least about 0.01 molar at ambient room temperatures. Such acyl halides may be mono, di, tri or higher in functionality although the dihalides are preferred since they yield diisocyanates which are highly useful commercially for the preparation of polyurethanes, polyureas and the like, through reaction with active hydrogen containing organic compounds. Of the acyl halides the acyl chlorides are preferred because of their more ready availability and/or preparation. The following are representative of various organic acyl halides which find use in our process: aliphatic acyl halides—octanoyl chloride, decanoyl chloride, 10-undecenoyl chloride, dodecanoyl chloride, palmitoyl chloride, oleoyl chloride, stearoyl chloride, cyclohexane acid chloride, suberoyl chloride, sebacoyl chloride, n-decane-1,10-dicarboxylic acid dichloride, n-hexadecane-1,16-dicarboxylic acid dichloride, and the like; aromatic acyl halides—benzoyl chloride, terephthaloyl chloride, isophthaloyl chloride, 1,5-naphthalene diacid chloride, and the like; and complex materials such as the diacid chloride of 1,1,3-trimethyl-5-carboxy-3-(p-carboxyphenyl)indan, the chlorides of polymeric fat acids and the like.

One preferred group of starting materials are the halides of polymeric fat acids. The halogenation or chlorination of the acids can be carried out by conventional procedures using $PCl_3$ and the like. Polymeric fat acids are well known and commercially available. One method of preparation of polymeric fat acids can be seen in U.S. Pat. 3,157,681. The polymeric fat acids useful in preparing the starting acyl halides are produced by polymerizing ethylenically unsaturated monobasic carboxylic acids having 16 to 22 carbon atoms or the lower alkyl esters thereof. The preferred aliphatic acids are the mono and polyolefinically unsaturated 18 carbon atom acids. Representative octadecenoic acids are 4-octadecenoic, 5-octadecenoic, 6-octadecenoic (petroselinic), 7-octadecenoic, 8-octadecenoic, cis-9-octadecenoic (oleic), trans-9-octadecenoic (elaidic), 11-octadecenoic (vaccenic), 12-octadecenoic and the like. Representative octadecadienoic acids are 9,12-octadecadienoic (linoleic), 9,11-octadecadienoic, 10,12-octadecadienoic, 12,15-octadecadienoic and the like. Representative octadecatrienoic acids are 9,12,15-octadecatrienoic (linolenic), 6,9,12-octadecatrieonic, 9,11,13-octadecatrienoic (eleostearic), 10,12,14-octadecatrienoic (pseudo eleostearic) and the like. A representative 18 carbon atom acid having more than three double bonds is moroctic acid which is indicated to be 4,8,12,15-octadecatetraienoic acid. Representative of the less preferred (not as readily available commercially) acids are: 7-hexadecenoic, 9-hexadecenoic (palmitoleic), 9-eicosenoic (gadoleic), 11-eicosenoic, 6,10,14-hexadecatrienoic (hiragonic), 4,8,12,16-eicosatetraenoic, 4,8,12,15,18-eicosapentanoic (timnodonic), 13-docosenoic (erucic), 11-docosenoic (cetoleic), and the like.

The ethylenically unsaturated acids can be polymerized using known catalytic or non-catalytic polymerization techniques. With the use of heat alone, the mono-olefinic acids (or the esters thereof) are polymerized at a very slow rate while the polyolefinic acids (or the esters thereof) are polymerized at a reasonable rate. If the double bonds of the polyolefinic acids are in conjugated positions, the polymerization is more rapid than when they are in the non-conjugated positions. Clay catalysts are commonly used to accelerate the polymerization of the unsaturated acids. Lower temperatures are generally used when a catalyst is employed.

It is also preferred that the polymeric fat acids used in the preparation of the halides are hydrogenated in order to improve the color thereof. The hydrogenation is accomplished using hydrogen under pressure in the presence of a hydrogenation catalyst. The catalysts generally employed in such hydrogenations are Ni, Co, Pt, Pd, Rh and others of the platinum family. In general, the catalyst is suspended on an inert carrier such as kieselguhr, commonly used with Ni, and carbon, commonly used with the platinum family of catalysts.

The starting acyl halide preferably has a low free acid content to avoid emulsification problems during the reaction with the metal azide and quaternary ammonium salt. It is also preferred to use those acyl halides which yield azides having nine or more carbon atoms per azide group. An approximate rule of thumb has been that compounds containing less than nine carbon atoms per azide group may be subject to detonation if not carefully handled physically.

Any of a variety of essentially water immiscible organic solvents may be used in our process. These solvents are preferably the aliphatic, alicyclic or aromatic hydrocarbons such as heptane, cyclohexane, toluene, benzene or a chlorinated hydrocarbon such as methylene chloride, chlorobenzene and the like. The concentration of the acyl halides in the solvent is not critical but preferably varies from about 5 to 30% by weight.

The metal azides which may be employed in the production of isocyanates in accordance with our invention are preferably the alkali metal or alkaline earth metal azides such as potassium azide, sodium azide nd the like. Sodium azide is especially preferred. It is also preferred to use an aqueous solution of the metal azide. The metal azide is used in an amount at least equivalent to the acyl halide. It is additionally preferred to use an excess of the metal azide. As indicated previously, an aqueous solution of the metal azide need not be used if there is sufficient water present from the quaternary ammonium compound or otherwise to allow interchange between the azide ion and the anion of the quat. However, a distinct aqueous phase is highly desirable and preferred to facilitate the separation of the solution of acyl azide from the by-product metal halide salts and any excess metal azide used.

When an aqueous solution of the metal azide (i.e. sodium azide) is used and the acyl halide contains some free acid, it is preferred to add a small amount of hydrochloric acid to the aqueous metal azide solution. The HCl presumably serves to keep any free carboxylic acid undissociated. When free carboxylic acids are present in the acyl halides, they tend to dissociate and form soaps and thus further enhance any tendency of the system to emulsify.

The quaternary ammonium salt has a solubility in the essentially water-immiscible organic solution of at least about 0.0001 molar at ambient room temperatures. However higher solubilities are preferred. Additionally, it is preferred that the quaternary ammonium salt should have a greater solubility in the essentially water immiscible organic solvent than in water. The general structural formula for simple quaternary ammonium compounds is as follows:

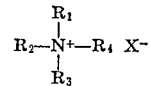

In the present invention, $X^-$ may be halide, sulfate, phosphate, azide, hydroxyl and the like anions. $X^-$ is preferably $Cl^-$ or $Br^-$. $R_1$-$R_4$ may be a variety of organic radicals such as alkyl, aryl and the like. Representative of such radicals are methyl, ethyl, propyl, butyl, pentyl, hexyl, heptyl, octyl, nonyl, decyl, undecyl, dodecyl, hexadecyl, heptadecyl, octadecyl, benzyl and the like. The preferred quaternary compounds are those derived from fat acids and include those which contain from 1 to 4 fat acid residues (i.e. hydrocarbon groups) of up to about 24 carbon atoms. With those quaternary compounds containing less than 4 long chain hydrocarbon groups, the remaining substituents on the nitrogen are preferably short chain alkyl groups of 1 to 4 carbon atoms such as methyl, ethyl, propyl and butyl. When using aliphatic hydrocarbon solvents such as n-heptane, it is especially preferred to use quaternary ammonium chlorides wherein $R_1$-$R_4$ are aliphatic hydrocarbon groups containing a total of about 26 to 30 carbon atoms.

The quaternary ammonium salt is used in an amount sufficient to accelerate the conversion of the acyl halide to the acyl azide. Amounts as low as 0.1 equivalent percent of the acyl halide have given good results. Of course, the quaternary ammonium salt can be used in amounts equivalent to the acyl halide, or even higher. However, there is no particular advantage in using high amounts and there are disadvantages in doing so—i.e. the quaternary compound should be removed prior to the decomposition of the acyl azide to isocyanate to avoid undesired side reactions. Thus the quaternary ammonium salt is preferably used in amounts of from about 0.01 to 10 equivalent percent based on the acyl halide.

The first step in our process is carried out at temperatures below the point where there is significant decomposition of the acyl azide to isocyanate. Thus the upper limit will primarily depend on the stability of the acyl azide. Most aliphatic acyl azides have significant rates of decomposition above about 10° C. whereas the aromatic acyl azides have generally higher temperatures of decomposition—i.e. above about 20° C. Accordingly, the first step of the process is preferably carried out at temperatures below about 25° C. and more preferably at temperatures in the range of about 0 to 15° C. The reaction is normally exothermic and thus it is desirable to provide cooling to maintain the temperature at the desired level.

It is also preferred to agitate or stir the reactants during the reaction period. However, such mixing should not be of such an intense nature as to cause the formation of stable emulsions. The reaction is normally complete in less than one half hour, after which period the acyl azide containing organic solution is separated by conventional means from the aqueous phase and/or solid by-product metal salts and metal azide.

The acyl azide containing organic solution is then heated to cause the acyl azide to decompose to the corresponding organic isocyanate. Such heating is dependent on the stability of the acyl azide as well as of the stability of the isocyanate product. Preferably, temperatures of from about 25 to 150° C. are used to effect such decomposition. The solvent can then be removed such as by distillation to yield the organic isocyanate product. In some cases, however, the isocyanate solution will find use per se and thus solvent removal is optional.

Prior to the decomposition reaction, it is desirable to wash the acyl azide containing solution to reduce the amount of quaternary ammonium compounds contained therein. A preferred washing mixture is a 50% by volume acetonitrile-water mixture and the washings can be repeated one or more times and can, optionally, be followed by simple water washing. Water washing alone can be used as well as other wash mixtures or solutions. The preferred wash solution will depend somewhat on the quaternary used.

The following examples serve to illustrate preferred embodiments of the invention without being limiting.

Example I

A 500 ml. three neck flask fitted with a thermometer, mechanical stirrer and jacketed dropping funnel and containing 11.0 g. sodium azide, 125 ml. water and 0.7 g. methyl trifatty ammonium chloride (Aliquat® 336S which has 28 carbon atoms and wherein the fatty groups were derived from the shorter chain acids of coconut oil and contain 8–10 carbon atoms each) was cooled to 5–10° C. in an ice-salt bath. A precooled solution of 45.6 g. (0.15 mole) of stearoyl chloride containing 0.2% free acid in 250 ml. cyclohexane was then added through the dropping funnel to the stirred mixture at such a rate that the reaction temperature was maintained below 10° C. After the addition of the stearoyl chloride was complete, the mixture was stirred for an additional 5 minutes. The reaction mixture then was transferred to a cold separatory funnel and was washed two times with 250 ml. portions of a 50% by weight acetonitrile in water solution. The resulting organic layer then was washed once with water, separated and dried over magnesium sulfate. After filtration, the cyclohexane solution of stearoyl azide was heated to 80° C. during which time a copious evolution of nitrogen gas occurred. After cooling to ambient temperature, the cyclohexane was distilled under reduced pressure leaving 39.2 g. of n-heptadecylisocyanate having a boiling point of 98° C. and an infrared isocyanate absorption of 4.41$\mu$. The yield was 93% with a purity of 96% (based on infrared measurements).

Examples II–VIII

Example I was essentially repeated except varying amounts of quaternary and stearoyl chloride were used and the latter contained varying amounts of free acid. Results are set forth in the following Table I:

TABLE I

| Example | Conc. of stearoyl chloride (g./100 ml. cyclohexane) | Conc. of quaternary (moles/100 moles stearoyl chloride) | Mole percent acid in stearoyl chloride | Percent Yield | Purity[1] |
|---|---|---|---|---|---|
| II | 17 | 5 | 0 | 97 | 97 |
| III | 17 | 5 | 6 | ------ | 80 |
| IV | 17 | 5 | 3.6 | 90 | 81 |
| V | 17 | 5 | 0 | 100 | 94 |
| VI | 20 | 5 | 0.6 | 83 | 93 |
| VII | 20 | 1 | 1.2 | 86 | 79 |
| VIII | 17 | 1 | 0 | 99 | 95 |

[1] Given as percent of isolated product from infrared measurements.

The above data show that the percent free acid affects yield and emulsification problems increased as the free acid concentration increased. When 5 mole percent of the quaternary was used as in Example II but the acetonitrile-water wash was not carried out, only tri-n-heptadecyl-isocyanurate was isolated. This demonstrates that at least partial removal of the quaternary is needed at such levels.

Example IX

Example I was essentially repeated except that no water was used and 5 mole percent of the quaternary ammonium chloride containing 4.4% by weight water was used. The reaction was essentially 100% complete at 25° C. in 20 minutes (approximate infrared determination). The water in the quaternary ammonium chloride was sufficient to allow ionization of the reactants. In the absence of the quaternary ammonium chloride, the same reaction took five hours to reach essentially 100% completion.

Example X

Example I was essentially repeated using 50.3 g. (0.184 mole) palmitoyl chloride, 250 ml. of cyclohexane, 14.3 g. (0.22 mole) sodium azide, 140 ml. water and 0.25 g. of the quaternary ammonium chloride as used in Example I. There was obtained 45.9 g. of n-pentadecylisocyanate (essentially 100% pure). There was 0% palmitoyl chloride remaining at the point when addition of the same to the other reactants was complete.

Examples XI–XVII

Example X was essentially repeated using either no quaternary ammonium compound or other quaternaries as identified in the following Table II:

TABLE II

| Example | Quaternary ammonium salt | Number of carbon atoms in the quaternary ammonium salt | Percent palmitoyl chloride remaining after addition was complete |
|---|---|---|---|
| XI | None | -- | 92 |
| XII | (CH$_3$)$_4$N$^+$Br$^-$ | 4 | 88 |
| XIII | PhCH$_2$(CH$_3$)$_2$PhN$^+$Cl$^-$ | 15 | 38 |
| XIV | (n-C$_4$H$_9$)$_4$N$^+$Br$^-$ | 16 | 28 |
| XV | (n-C$_5$H$_{11}$)$_4$N$^+$Br$^-$ | 20 | 8 |
| XVI | (n-C$_7$H$_{15}$)$_4$N$^+$Cl$^-$ | 28 | 1–2 |
| XVII | Aliquat® 226 [1] | 38 | ([2]) |

[1] Dimethyl di(hydrogenated tallow)ammonium chloride.
[2] Quaternary not soluble in either phase.

The above data and that of Example X show that optimum reaction in clyclohexane is obtained when using a quaternary ammonium salt containing 28 carbon atoms.

Example XVIII

A 500 ml. Morton flask containing 6.8 g. (0.105 mole) sodium azide in 27 g. water, 5.0 g. concentrated hydrochloric acid, and 2.5 g. of a 48% by weight cyclohexane solution of the quaternary ammonium chloride as used in Example I (0.003 mole) was cooled to about 5° C. in an ice-salt bath. The flask was fitted with a thermometer, mechanical stirrer and jacketed dropping funnel. A solution of 28.9 g. (0.95 mole) dimer acid chloride in 35 ml. n-heptane was then added at such a rate as to maintain the temperature of the reaction mixture below 10° C. (the addition was completed in 20 minutes). The dimer acid chloride had the formula ClOC—D—COCl where D is the 34 carbon atom divalent hydrocarbon radical of the dimerized fat acid obtained by polymerizing, distilling and hydrogenating (in the presence of palladium catalyst) the mixture of fat acids derived from tall oil (composed of approximately 40–45% linoleic and 50–55% oleic, such percentages being by weight). The dimer acid chloride contained 0.3 mole percent free acid. The reaction mixture was stirred vigorously throughout the dimer acid chloride addition and, after the addition was complete, the mixture was stirred an additional 5 minutes. The contents of the reaction flask then were transferred to a precooled separatory funnel and the layers were separated. The organic layer was washed twice with 100 ml. portions of a 50% (by weight) acetonitrile-water mixture and once with water. After separating, the organic solution was dried over magnesium sulfate, filtered and approximately 50% of the solvent was removed by vacuum distillation at 0–10° C. The residue then was slowly added to 100 ml. of n-heptane which was maintained at about 70° C. Vigorous evolution of nitrogen gas occurred during the decomposition reaction which was very exothermic. The addition was controlled so that the reaction temperature was maintained at about 80° C. without the application of external heat. After the addition was complete and gas evolution had subsided, the solution was cooled to ambient temperature and the solvent was removed by distillation under reduced pressure. The yield of diisocyanate (OCN—D—NCO)

was 25.9 g. (96.7%). The diisocyanate had a purity of 96% (percent of isolated product determined as isocyanate by infrared), a boiling point of 270° C. (50μ, wiped film still) and an isocyanate content of 13.9% (undistilled-di-n-butyl amine titration).

Examples XIX–XXXVIII

Example XVIII was essentially repeated except using varying amounts of quaternary and dimer acid chloride, varying reaction scales as indicated by the amount of dimer acid chloride, either cyclohexane or n-heptane and various lots of the dimer acid chloride containing different levels of acid. The results are set forth in the following Table III:

organic bottom layer was transferred to a separatory funnel and washed twice with 300 ml. portions of water. After separation the organic layer was dried over anhydrous magnesium sulfate. The magnesium sulfate then was removed by filtration and the filtrate was heated to boiling (approximately 40° C.) on a steam bath to remove approximately half of the methylene chloride. The diacyl azide was precipitated from the methylene chloride solution by addition of n-heptane. The yield of diacyl azide was 70.3 g. of a white solid which appeared free of isocyanate and quaternary impurities by infrared analysis.

A saturated solution of 46.6 g. of the diacyl azide as prepared above in chlorobenzene was heated to reflux. Gas evolution began immediately and heating was continued until gas evolution ceased. The solution was cooled to −20° C. and the phenylindane diisocyanate was collected by filtration. The filtrate was partially distilled under reduced pressure and, after cooling to −20° C., more product was collected by filtration and added to the original residue. The total yield was 41.3 g. of 1,1,3-trimethyl-5-isocyanato-3-(p-isocyanatophenyl)indan having a melting point of 92–95° C.

Example XL

Example X was essentially repeated except as to scale of reactants, the use of n-heptane in place of cyclohexane and with 20.3 g. of 10 undecenoyl chloride instead of palmitoyl chloride. There was obtained 17.4 g. of 9-n-decenyl isocyanate (infrared: 4.41μ isocyanate absorption).

TABLE III

| Example | Dimer acid chloride (gms.) | Wt. percent[1] dimer acid chloride in solvent | Wt. percent NaN₃ in H₂O | Percent quaternary (moles/100 moles) dimer acid chloride | Mole percent acid in dimer acid chloride | Percent Yield | Purity[2] | NCO[3] |
|---|---|---|---|---|---|---|---|---|
| XIX | 50 | 17 | 10 | 1 | 0.3–0.4 | 99 | 93 | 13.6 |
| XX | 50 | 17 | 10 | 1 | 6.0 | Emulsion (not completed) | | |
| XXI | 50 | 17 | 10 | 1 | 1.4 | Emulsion (not completed) | | |
| XXII | 77 | 45 | 20 | 1 | 0.8 | Emulsion (not completed) | | |
| XXIII | 107 | 50 | 10 | 5 | 0.8 | Polymerization of product occurred[4] | | |
| XXIV | 400 | 50 | 20 | 5.5 | 0.5 | 90 | 82 | 11.5 |
| XXV | 500 | 50 | 20 | 5 | 0.3 | 95 | 90 | 12.3 |
| XXVI | 500 | 50 | 20 | 5 | 0.15 | (5) | 97 | 13.3 |
| XXVII | 570 | 50 | 20 | 5.5 | 0.1 | 86 | 97 | 13.3 |
| XXVIII | 570 | 50 | 22 | 5.5 | 0.1 | (5) | 84 | 11.5 |
| XXIX | 444 | 50 | 20 | 4 | 0.4 | 90.5 | 90 | 13.0 |
| XXX | 48 | 50 | 20 | 4 | 0.1 | 86.5 | 92 | 13.2 |
| XXXI | 570 | 50 | 18 | 5 | 0.1 | 80 | 57 | (6) |
| XXXII | 588 | 50 | 20 | 5 | 0.15 | Polymerization of product occurred[4] | | |
| XXXIII | 620 | 50 | 20 | 5 | 0.6 | 80 | 93 | 12.5 |
| XXXIV | 624 | 40 | 20 | 3 | 0.4 | 84 | 76 | 9.9 |
| XXXV | 645 | 50 | 20 | 2.5 | 0.3 | 77 | 81 | 10.5 |
| XXXVI | 598 | 50 | 20 | 3 | 0.4 | 96 | 75 | (6) |
| XXXVII | 33 | 50 | 20 | 3 | 0.4 | 94 | 93 | 13.8 |
| XXXVIII | 30 | 50 | 20 | 3 | 0.4 | 93 | 97 | 14.0 |

[1] Cyclohexane used as the solvent in Examples XIX–XXIII; n-heptane used in the remainder.
[2] Percent of isolated product as determined by infrared.
[3] As determined by titration with di-n-butylamine.
[4] The polymerization was probably caused by contamination of the sample with water.
[5] Not measured due to spillage.
[6] Not determined.

The data of the above examples show that optimum results are obtained on a small reaction scale using dimer acid chloride having a low free content and n-heptane as the solvent (generally). Scale up of the reaction tended to cause more severe emulsification problems as did higher free acid contents.

Example XXXIX

To 39.0 g. (0.60 mole) sodium azide, 200 ml. water and 2 g. (0.004 mole) of the quaternary ammonium chloride as used in Example I at 5° C. in a flask equipped with stirrer, thermometer and dropping funnel was added a solution of 95.8 g. (0.27 mole) of the diacid chloride of 1,1,3-trimethyl - 5 - carboxy-3-(p-carboxyphenyl)indan in 300 g. methylene chloride at such a rate as to maintain the temperature of the mixture below 10° C. (the addition was completed in 30 minutes). The two-phase mixture was vigorously stirred throughout the addition and for twenty minutes after the addition was complete. The

Example XLI

A mixture of 7.2 g. sodium azide in 30 ml. water and 5 drops of a 48% by weight solution of the quaternary ammonium chloride as used in Example I in cyclohexane was cooled to about 5° C. in an ice bath. A precooled solution of 14.0 g. benzoyl chloride in 75 ml. cyclohexane was then added with stirring over a 30 minute period. After the addition was complete, the mixture was stirred an additional five minutes. The mixture then was placed in a separatory funnel and the organic layer was separated, washed once with water and dried over magnesium sulfate. The dried solution of benzoyl azide was heated to reflux at about 80° C. for approximately three hours. The cyclohexane then was distilled from the product. There was obtained 10.9 g. of phenyl isocyanate (percent NCO—25.7 by di-n-butyl amine titration; 4.5μ infrared isocyanate absorption).

The embodiments of the invention in which an exclusive property or privilege is claimed are defined as follows:

1. In the process of preparing an organic isocyanate wherein an organic acyl halide dissolved in an essentially water immiscible organic solvent is reacted with an alkali or alkaline earth metal azide to form the acyl azide which is then decomposed to the organic isocyanate, the improvement comprising carrying out the reaction of the organic acyl halide having a solubility of at least about 0.01 molar at ambient room temperature in the essentially water-immiscible organic solvent and the metal azide with the addition of a quaternary ammonium salt and in the presence of sufficient water to allow the reactants to allow interchange between the azide ion and anion of the quaternary ammonium salt, said quaternary ammonium salt having a solubility of at least about 0.0001 molar at ambient room temperature in the essentially water-immiscible organic solvent, a greater solubility in the essentially water-immiscible organic solvent than in water and being present in an amount sufficient to accelerate the formation of the organic acyl azide.

2. The process of claim 1 wherein water is present in an amount sufficient to form an aqueous solution with the metal azide.

3. The process of claim 2 wherein the aqueous and organic phases are mixed during the reaction.

4. The process of claim 2 wherein the quaternary ammonium salt is used in an amount of about 0.01 to 10 equivalent percent based on the organic acyl halide.

5. The process of claim 4 wherein the metal azide is sodium azide and the quaternary ammonium salt is a quaternary ammonium halide.

6. The process of claim 5 wherein the organic acyl halide is difunctional.

7. The process of claim 6 wherein the organic acyl halide is a dimer acid chloride derived from dimerized fat acids prepared by polymerizing ethylenically unsaturated monocarboxylic acids of from 16 to 22 carbon atoms.

8. The process of claim 6 wherein the organic acyl halide is monofunctional.

9. The process of claim 6 wherein the organic acyl halide is stearoyl chloride.

10. The process of claim 5 wherein the solvent is an aliphatic hydrocarbon.

11. The process of claim 5 wherein the organic and aqueous phases are separated after the formation of the organic acyl azide and the organic phase is washed to reduce the amount of quaternary ammonium salt therein prior to decomposing the organic acyl azide to the organic isocyanate.

References Cited

UNITED STATES PATENTS 3,324,148   6/1967   Cotter _____ 260—349

OTHER REFERENCES

Organic Reactions, vol. III, John Wiley & Sons, Inc., New York, pp. 373–6 (1946).

LEWIS GOTTS, Primary Examiner

D. H. TORRENCE, Assistant Examiner

U.S. Cl. X.R.
260—349, 407, 408